July 24, 1956 H. R. SMITH ET AL 2,756,338

VARIABLE RADIO FREQUENCY INTERSTAGE IMPEDANCE

Filed July 23, 1952

INVENTORS.
Harry R. Smith
Allen R. Taylor,
BY [signature]
ATTORNEY

United States Patent Office 2,756,338

Patented July 24, 1956

2,756,338

VARIABLE RADIO FREQUENCY INTERSTAGE IMPEDANCE

Harry R. Smith, Verona, and Allen R. Taylor, Belleville, N. J., assignors to Standard Electronics Corporation, Newark, N. J., a corporation of Delaware Application July 23, 1952, Serial No. 300,544

5 Claims. (Cl. 250—40)

This invention involves a device for interconnecting radio frequency stages. It is an object of the invention to provide such a device which is particularly adapted as an interstage coupling means for a television transmitter. It is a further object of the invention to make the device one that is readily adjustable for various radio frequency channels.

The interstage coupling circuit of this invention is essentially a series combination of tunable condenser means and an adjustable reactance device which is primarily inductive. The inductive device is so constructed as to provide a ready means for making a rough adjustment in tuning for a desired radio frequency channel. The tunable condenser provides means for fine tuning.

The primarily inductive interstage impedance device is readily and easily formed of a flat conductive plate having a plurality of parallel slots therein. Each of the slots extends from an edge of the plate substantially, but not entirely, therethrough. Alternate ones of the slots extend from opposite edges of the plate which results in a sinuous inductive path through the plate. Adjustable shorting means which may take the form of screws and coacting nut means are located in the slots for adjustably clamping the plate along the edges of the slots. By adjusting the shorting means, the effective length of the sinuous inductive path across the plate, and thus its effective inductive reactance, may be varied. There is thus provided an interstage impedance device which is rugged, easily adjustable, accurately tunable and inexpensive to manufacture.

An embodiment of the invention which has proved highly efficient is one intended for operation on television channels 7 to 13 inclusive i. e., 175 to 216 megacycles, although these frequencies are not the limits over which devices according to the principle of this invention are capable of operating.

Figure 1:
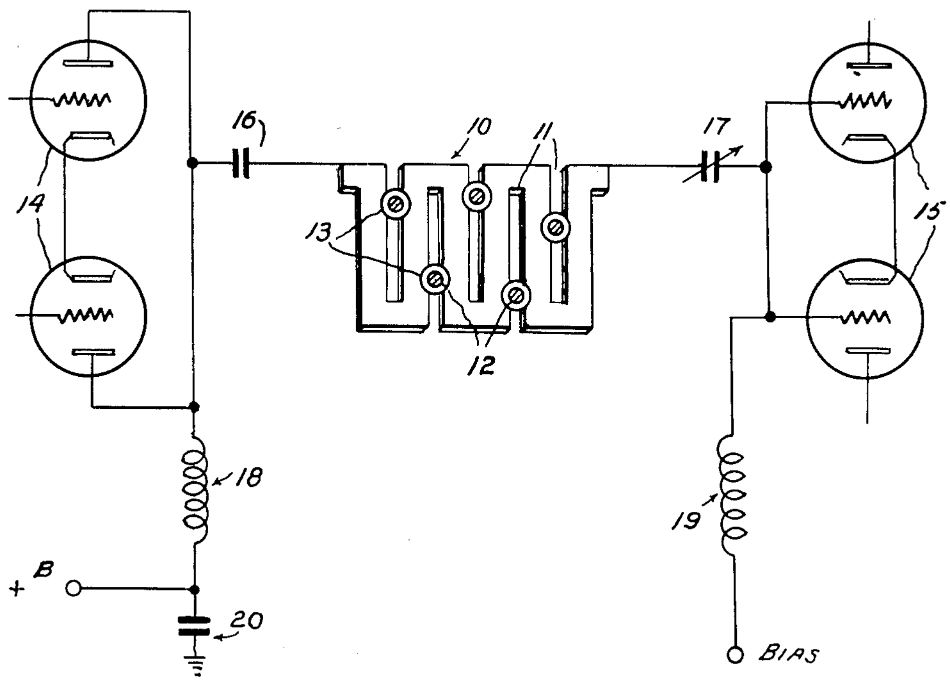
Figure 2:
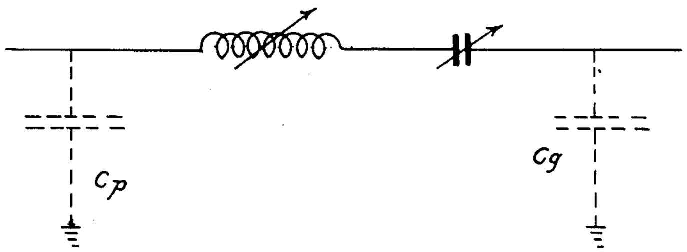

Reference is now made to the drawings in which Figure 1 is a perspective view of the variable high frequency impedance element which is primarily inductive in character. Figure 1 also shows in a schematic diagram the circuit elements connected to the variable high frequency impedance element to form therewith one embodiment of an interstage coupling circuit according to this invention. Figure 2 shows the equivalent R. F. circuit diagram of the coupling circuit of Figure 1.

With reference first to Figure 1, the variable high frequency impedance element is shown in perspective at 10. It is seen to be a flat plate having parallel grooves 11 formed therein. Each of the grooves 11 extends from an edge of the plate 10 substantially, but not entirely, through the plate and alternate grooves extend from opposite edges of the plate. There is thus provided a sinuous, inductive path across the plate 10.

Shorting means in the grooves may conveniently take the form of screws indicated at 12 and coacting nuts, not shown, for adjustably clamping the plate along the edges of the grooves. Washers 13 may be used, if desired, to aid the conductive clamping action. It will be seen that by moving the adjustable shorting means along the grooves the effective inductive length of the plate 10, and hence its inductive reactance, may be varied.

The element 10 is shown as part of a coupling circuit between tubes 14 and 15. The tubes 14 in one embodiment of the invention are type 4–65A tubes while the tubes 15 are type 4x500A's. At 16 is a D. C. blocking condenser and at 17 is a fine tuning condenser. The latter is, in the instant embodiment, a conventional air variable condenser. At 18 and 19 are radio frequency chokes while 20 is a conventional B+ bypass condenser.

In operation, the shorting devices 12, 13 are adjusted such that the circuit resonates at a desired TV channel. Fine tuning is accomplished thereafter by means of condenser 17.

Figure 2 shows the equivalent R. F. circuit of Figure 1. Since condenser 16 is large it may be neglected. The plate to ground capacity of the 4–65A tubes 14 is indicated in dotted lines at $C_p$. The grid to ground capacity of the 4x500A tubes 15 is indicated at $C_g$. The circuit is in resonance when the inductive reactance of the slotted plate or sheet 10 is equal to the capacitive reactance of the series combination of $C_p$, 17 and $C_g$.

We claim:

1. A variable radio frequency interstage impedance comprising a metal plate, said plate having substantially parallel slots therein, each of said slots extending from an edge thereof through a substantial portion of said plate but stopping short of the opposite edge thereof, alternate ones of said slots extending from opposite edges of said plate to form connected strips whereby a sinuous inductive path across said plate is formed, the said strips lying substantially in a single plane, and shorting means comprising clamping elements in said slots adjustably clamping said plate adjacent the edges of said slots whereby the effective inductive reactance of said interstage impedance may be varied by movement of said shorting means.

2. Variable radio frequency interstage coupling means comprising in series combination a direct current blocking condenser, a variable impedance and a fine tuning condenser, said variable impedance comprising a metal plate, said plate having parallel slots, each of said slots extending from an edge of said plate through a substantial part thereof, alternate ones of said slots extending from opposite edges of said plate forming a sinuous inductive path of connected strips across said plate, shorting elements comprising adjustable clamping means located in said slots for adjustably clamping said plate adjacent the edges of said slots whereby the effective inductive reactance of said plate may be varied to provide a rough tuning means for selecting certain high frequency channels, and said fine tuning condenser providing a fine adjustment for said channels.

3. Variable radio frequency interstage coupling means for coupling radio frequency energy from a plate of one stage to a grid of a succeeding stage comprising in series a direct current blocking condenser, a variable impedance device and a fine tuning condenser, said variable impedance device comprising a metal plate, said plate having parallel slots, each of said slots extending from an edge of said plate through a substantial part thereof, alternate ones of said slots extending from opposite edges of said plate forming a sinuous inductive path of connected strips across said plate, shorting means comprising conductive screw and coacting nut means located in said slots adjustably clamping said plate adjacent the edges of said slots whereby the effective inductive reactance of said plate for a desired radio frequency channel is made substantially equal to the capacitive reactance of the series combination which comprises the plate-to-ground and grid-to-ground capacities of said stages plus the capacity of said fine tuning condenser.

4. Adjustable radio frequency interstage coupling means for television transmitters coupling radio frequency energy from a plate of one stage to a grid of the succeeding stage comprising in series a direct current blocking condenser, a variable impedance device and a fine tuning condenser, said variable impedance device comprising a uni-planar metal plate having parallel slots formed therein, each of said slots extending from an edge of said plate through a substantial part thereof, alternate ones of said slots extending from opposite edges of said plate forming a sinuous inductive path of connected strips across said plate, shorting means comprising conductive fastenings in said slots adjustably clamping said plate adjacent the edges of said slots.

5. Adjustable radio frequency interstage coupling means coupling the plate of one stage to the grid of another stage of a television transmitter comprising in series combination tunable condenser means and an adjustable radio frequency impedance device, said device comprising a flat conductive plate having parallel slots therein, each of said slots extending from an edge of said plate through a substantial part thereof, alternate ones of said slots extending from opposite edges of said plate forming a sinuous inductive path of connected strips across said plate, shorting elements comprising conductive fastening means located in said slots adjustably clamping said plate along the opposite edges of said slots whereby the inductive reactance of said device may be adjusted.

References Cited in the file of this patent

UNITED STATES PATENTS

| | | |
|---|---|---|
| 1,995,301 | Gebhard | Mar. 26, 1935 |
| 2,468,727 | Bauman | May 3, 1949 |
| 2,477,581 | Danziger | Aug. 2, 1949 |
| 2,532,263 | Silvey | Nov. 28, 1950 |
| 2,543,479 | Toman | Feb. 27, 1951 |
| 2,631,241 | Schmidt | Mar. 10, 1953 |